United States Patent
Tallman et al.

(10) Patent No.: US 7,562,951 B2
(45) Date of Patent: Jul. 21, 2009

(54) WALL CABINET SYSTEM

(75) Inventors: Randall E. Tallman, Holland, MI (US); William J. Lown, Coopersville, MI (US)

(73) Assignee: Windquest Companies, Inc., Holland, MI (US)

( * ) Notice: Subject to any disclaimer, the term of this patent is extended or adjusted under 35 U.S.C. 154(b) by 702 days.

(21) Appl. No.: 11/084,272

(22) Filed: Mar. 18, 2005

(65) Prior Publication Data

US 2005/0204694 A1     Sep. 22, 2005

Related U.S. Application Data

(60) Provisional application No. 60/554,517, filed on Mar. 19, 2004.

(51) Int. Cl.
 A47B 46/00 (2006.01)
 A47B 47/00 (2006.01)
 A47B 55/00 (2006.01)

(52) U.S. Cl. ............... 312/351.1; 312/351.5; 312/351.8; 312/233; 312/126; 312/127; 312/129; 312/281; 403/187; 403/231; 403/306; 403/403; 248/235; 248/238; 248/200; 248/205.1; 211/86.01

(58) Field of Classification Search ................. 403/187, 403/231, 306, 403; 248/235, 694, 503, 238, 248/200, 121, 205.1; 211/86.01, 88.01; 312/140.1, 312/140.4, 400, 406, 406.2, 245, 351.1
See application file for complete search history.

(56) References Cited

U.S. PATENT DOCUMENTS

| | | | | |
|---|---|---|---|---|
| 974,606 | A * | 11/1910 | Schrader | 403/219 |
| 1,865,734 | A * | 7/1932 | Wieland | 312/107 |
| 2,354,269 | A * | 7/1944 | Marchand | 248/243 |
| 3,341,270 | A * | 9/1967 | Sohl | 312/306 |
| 3,415,554 | A * | 12/1968 | Papayoti | 403/187 |
| 4,507,009 | A * | 3/1985 | Tardif | 403/306 |
| 4,616,950 | A * | 10/1986 | Morris | 403/231 |
| 4,953,339 | A * | 9/1990 | Jewell | 52/729.1 |
| 5,061,111 | A * | 10/1991 | Hosokawa | 403/232.1 |
| 5,297,888 | A * | 3/1994 | Nehls | 403/306 |
| 5,694,732 | A * | 12/1997 | Wilbert | 52/698 |
| 5,788,198 | A * | 8/1998 | Sharpe | 248/210 |
| 6,059,482 | A * | 5/2000 | Beauvoir | 403/262 |
| 7,048,462 | B2 * | 5/2006 | Lanphier | 406/188 |
| 2002/0153813 | A1 * | 10/2002 | Hadinata | 312/257.1 |

* cited by examiner

Primary Examiner—Jeanette Chapman
(74) Attorney, Agent, or Firm—Warner Norcross & Judd LLP

(57) ABSTRACT

A wall cabinet system includes a bracket and a plurality of fasteners for connecting first and second side panels and first and second shelves. The bracket includes a plurality of fastener receiving holes. A first fastener extends through an upper side panel and a first fastener receiving hole; a second fastener extends through the lower side panel and a second fastener receiving hole; a third fastener extends through the upper side panel, a third fastener receiving hole, and the upper shelf; and a fourth fastener extends through the lower side panel, a fourth fastener receiving hole, and the lower shelf.

11 Claims, 3 Drawing Sheets

WALL CABINET SYSTEM

BACKGROUND OF THE INVENTION

This application claims priority from U.S. Provisional Application Ser. No. 60/554,517, filed on Mar. 19, 2004.

The present invention is directed to a wall cabinet system, and more particularly to a bracket for interconnecting the side panels and shelves of a wall cabinet system.

Wall cabinet systems are well known as an aesthetically pleasing way to organize household items. These systems generally include four outer panels that are connected together to contain an organizing unit, such as a set of drawers, a shelving unit, or a stack of storage baskets. In order to provide a tidy appearance, the system is mounted to a wall a desired distance off of the floor.

In many cases, the organizing unit of a single wall cabinet system may be sectioned into a number of smaller units. For instance, a shelving unit may be stacked on top of a drawer unit to provide the consumer with options for organizing items.

Difficulties arise in the packaging of wall cabinet systems for sale to consumers, because many retailers limit the size and weight of any single container. These limits typically prevent large wall cabinet systems from being packaged in one piece, and in many cases they require dividing the outer panels into more manageable sizes. These limitations provide advantages for consumers, because the smaller units, such as a shelving unit and a drawer unit, can be sold separately. Each individual unit simply includes a pair of side panels, a top shelf forming an upper surface of the unit, and a bottom shelf forming a lower surface of the unit. Consumers can buy only the units that they want, and then connect them together as desired. Manufacturers must provide a means for connecting the individual units together. The connection means must add only a minimal cost for manufacturers, while making the connection of units as easy as possible for consumers.

SUMMARY OF THE INVENTION

The present invention is directed to a wall cabinet connection system including separate wall cabinet units to be easily and securely interconnected. In one embodiment, the present invention includes a bracket and a plurality of fasteners for connecting first and second side panels and first and second shelves. The bracket includes a plurality of fastener receiving holes. A first fastener extends through an upper side panel and a first fastener receiving hole; a second fastener extends through the lower side panel and a second fastener receiving hole; a third fastener extends through the upper side panel, a third fastener receiving hole, and the upper shelf; and a fourth fastener extends through the lower side panel, a fourth fastener receiving hole, and the lower shelf.

In a more specific embodiment, the bracket is a plate that includes a pair of inner holes and a pair of outer holes. The bracket is positioned against the side panels, with at least one inner hole and at least one outer hole overlapping the first side panel, and at least one inner hole and one outer hole overlapping the second side panel. The shelves each include a first side edge that abuts the bracket. The side edge of the upper shelf is aligned with the inner hole that overlaps the first side panel. The side edge of the second shelf is aligned with the inner hole that overlaps the lower side panel.

The present invention also includes a method for connecting first and second side panels and first and second shelves of wall cabinet system, comprising the steps of (a) placing a bracket against the first and second side panels, such that a portion of the bracket overlaps the first side panel and a portion of the bracket overlaps the second side panel; (b) abutting each of the first and second shelves against the bracket opposite the first and second side panels; (c) inserting a first fastener through the first side panel and into a first hole in the bracket; (d) inserting a second fastener through the second side panel and into a second hole in the bracket; (e) inserting a third fastener through the first side panel, a third hole in the bracket, and into the first shelf; and (f) inserting a fourth fastener through the second side panel, a fourth hole in the bracket, and into the second shelf.

The present invention provides a simple and effective way for connecting the units of a wall cabinet system, allowing manufacturers to meet all necessary packaging requirements and providing consumers with a wall cabinet system that is easy to assemble.

DETAILED DESCRIPTION OF THE CURRENT EMBODIMENT

Figure 1:
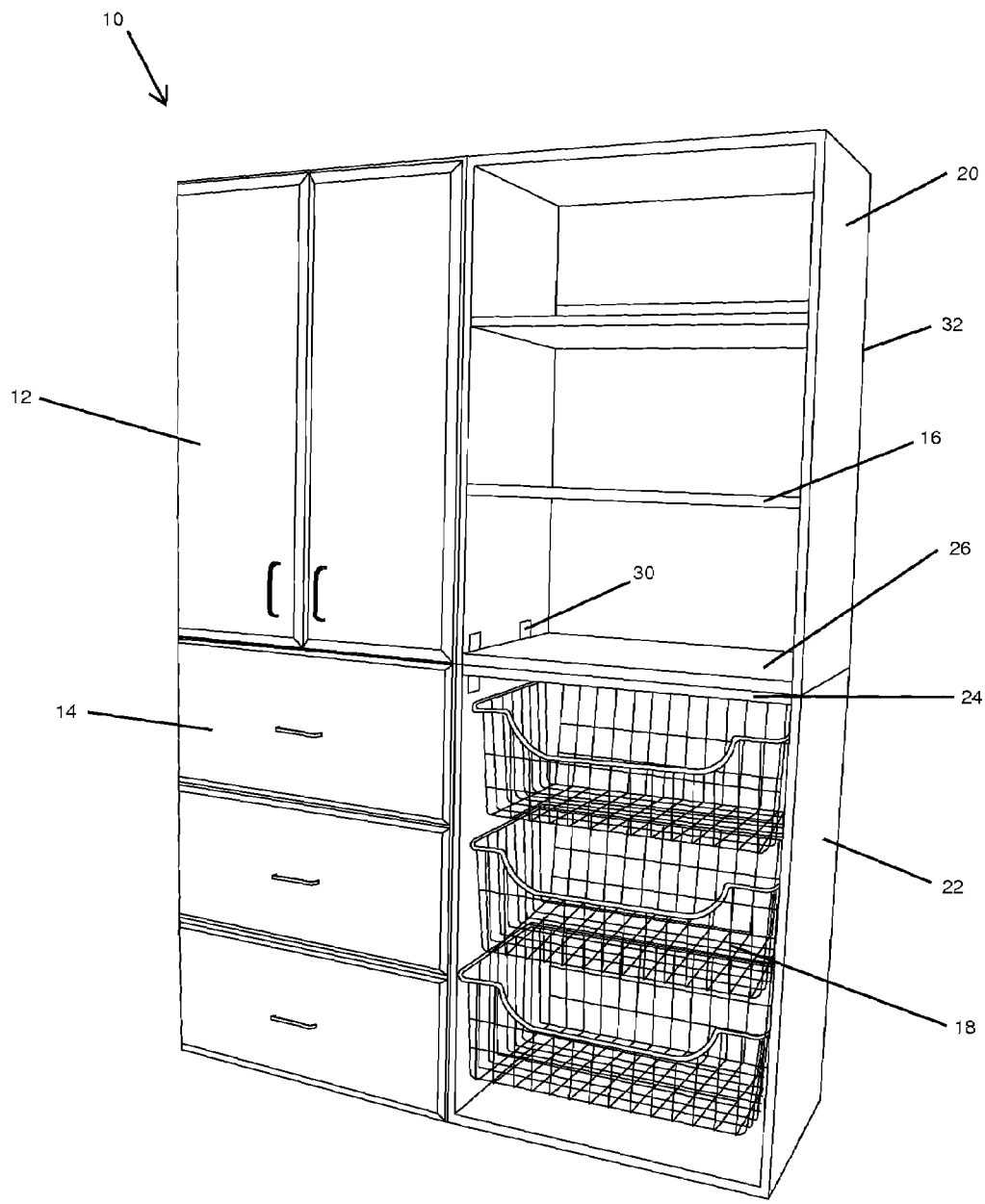
FIG. 1 is a perspective view of a wall cabinet system according to one embodiment of the present invention.

A wall cabinet system according to one embodiment of the present invention is shown in FIG. 1 and generally designated 10. In general, the wall cabinet system 10 is comprised of a number of upper side panels 20, lower side panels 22, and a number of shelves 24 and 26. An upper 20 and lower 22 side panel, and first 24 and second 26 shelves are interconnected by one or more brackets 30 and a plurality of fasteners 40.

As shown in FIG. 1, the wall cabinet system 10 is comprised of four individual wall cabinet units, including two upper units and two lower units. The upper units include a cabinet unit 12, a drawer unit 14, a shelving unit 16, and a storage basket unit 18. Notwithstanding the variety of units available, each unit generally includes a pair of side panels 20 or 22, a first shelf 24 forming an upper surface of the unit, and a second shelf 26 forming a lower surface of the unit. A wall cabinet system 10 is formed by connecting two or more of these individual units together. The entire wall cabinet system 10 may be mounted on a wall by a conventional mounting method, such as a plurality of hooks extending from the rear surface 32 of the system 10 that hang on brackets (not shown) attached to the wall. When the system 10 is mounted on a wall, the second shelves 26 of any lower units are spaced above the floor. Alternatively, the system 10 may not be hung from a wall and may rest on the floor. Individual units may be arranged and connected together as desired by the consumer. The bracket 30, as described below, is typically used to connect an upper unit (such as units 12 and 16 in FIG. 1) to a lower unit (such as units 14 and 18 in FIG. 1) disposed directly below the upper unit. Alternatively, the bracket 30 may be used to connect side-by-side units, for instance, in a configuration where the side panels 20 and 22 and shelves 24 and 26 are rotated 90 degrees and mounted on a wall.

Figures 2, 3:
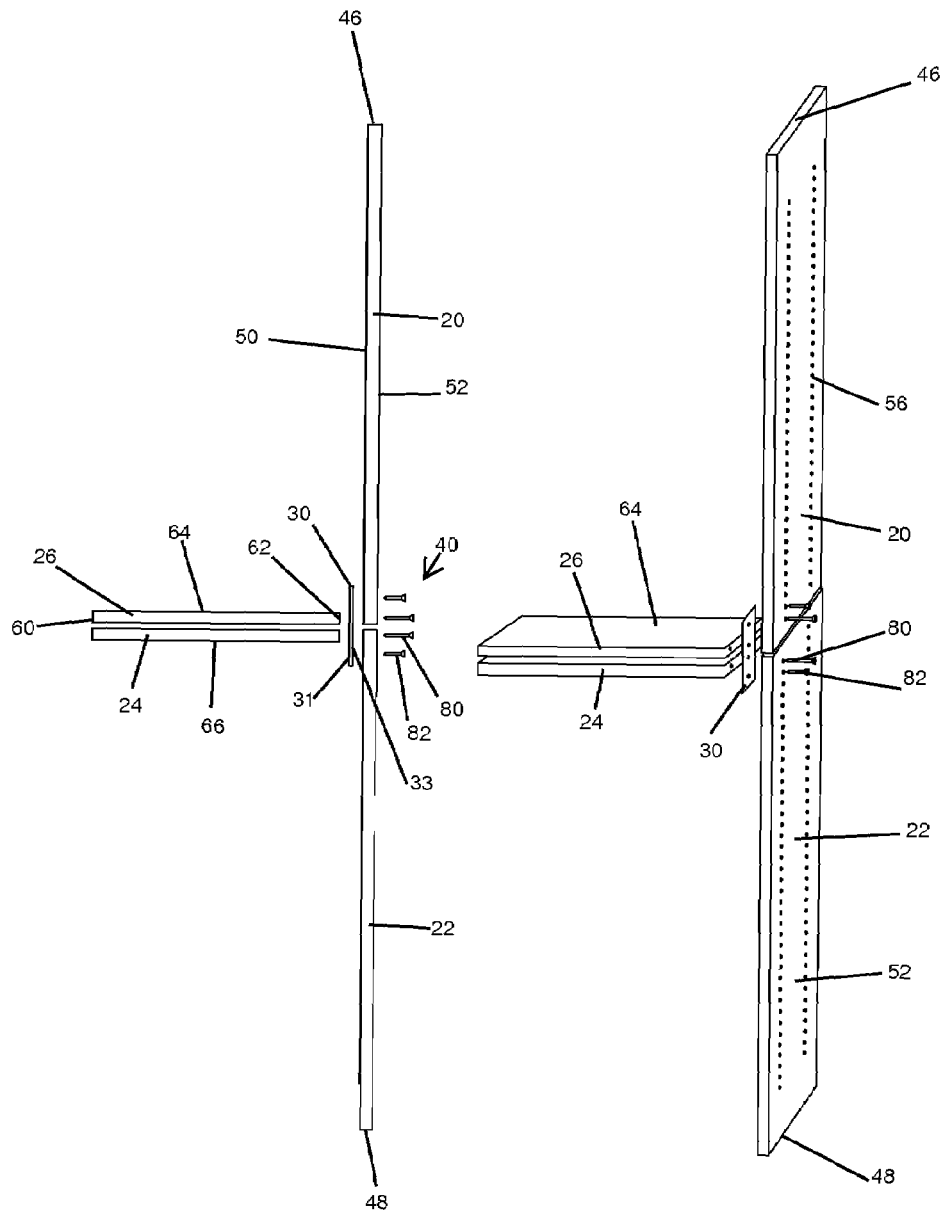
FIG. 2 is an exploded perspective view of the fasteners, side panels, bracket, and shelves of the present invention.
FIG. 3 is an exploded side view of the fasteners, side panels, bracket, and shelves of the present invention.

Referring now to FIGS. 2 and 3, the side panels 20 and 22 each include an upper surface 46, a lower surface, 48, and opposing front and rear surfaces 50 and 52. The side panels 20 and 22 may be comprised of a wide variety of materials, and may have a variety of shapes and sizes. In addition, the side panels may each include a plurality of fastener receiving holes 56 that extend through the front and rear surfaces 50 and 52. The shelves 24 and 26 each include opposing side edges 60 and 62, a top surface 64, and a bottom surface 66. The side edges 60 and 62 may include a number of pre-drilled, fastener receiving holes 68.

Figure 4:
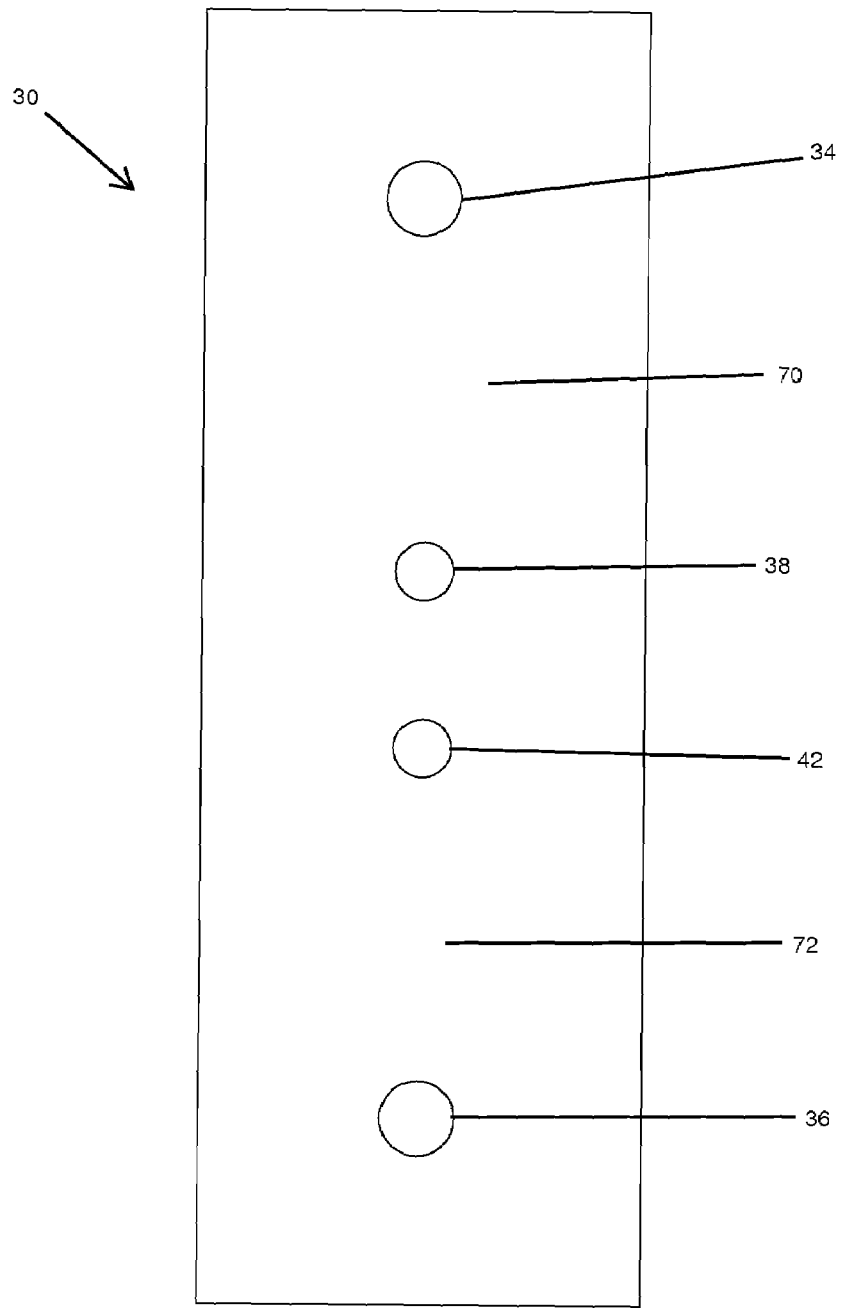
FIG. 4 is a front view of the bracket according to one embodiment of the present invention.

As shown in FIG. 4, the bracket 30 is typically a flat plate with opposing front 31 and back 33 surfaces, however, it may be L-shaped, U-shaped, or a wide variety of alternative shapes. It may be comprised of a variety of materials, such as metal or plastic. The bracket 30 includes a plurality of fastener receiving holes. In the illustrated embodiment, the bracket includes a pair of outer holes 34 and 36, and a pair of inner holes 38 and 42. The holes may be aligned in a row as illustrated, but this is not necessary. One outer hole 34 and one inner hole 38 are positioned in an upper portion 70 of the bracket 30, and the other outer hole 36 and inner hole 42 are positioned in a lower portion 72 of the bracket 30. As shown, the outer holes 34 and 36 are slightly larger than the inner holes 38 and 42. The holes may otherwise all have the same size, or may each have different sizes. In an alternative embodiment, the bracket 30 may be a flat plate without any holes, and may be comprised of a material for receiving self-tapping fasteners. The fasteners 40 are typically conventional, such as screws. The fasteners 40 may all be the same size and length, or they may be of varying lengths. As shown, the two inner fasteners 80 are longer than the two outer fasteners 82.

As shown in FIGS. 2 and 3, when connecting an upper wall cabinet unit to a lower wall cabinet unit, an upper side panel 20 (forming part of the upper wall cabinet unit) and a lower side panel 22 (forming part of a lower wall cabinet unit) are positioned such that the bottom edge 48 of the upper side panel 20 abuts the top edge 46 of the lower side panel 22. The bracket 30 is positioned against the inner surface 50 of the side panels 20 and 22, such that the upper portion 70 of the bracket 30 overlaps the upper side panel 20 and the lower portion 72 of the bracket overlaps the lower side panel 22. A first shelf 24 (forming part of the lower wall cabinet unit) and a second shelf 26 (forming part of the upper wall cabinet unit) are positioned perpendicular to the side panels 20, 22 with a side edge 62 of each shelf abutting the bracket 30. The shelves 24, 26 are further positioned such that the side edge 62 of the first shelf 24 is aligned with the inner hole 42 on the lower portion 72 of the bracket and the side edge 62 of the second shelf 26 is aligned with the inner hole 38 on the upper portion 70 of the bracket 30. As illustrated in FIGS. 2 and 3, there is a slight gap between the shelves 24, 26 in this position; however, the shelves 24, 26 may contact each other.

Once the side panels 20, 22, shelves 24, 26, and bracket 30 are positioned, they are secured into place with the fasteners 40. A first fastener extends through the upper side panel 22 and the outer hole 34 in the upper portion 70 of the bracket 30. A second fastener extends through the upper side panel 22, the inner hole 38 on the upper portion 70 of the bracket 30 and into the edge 62 of the second shelf 26. A third fastener extends through the lower side panel 22, the inner hole 42 on the lower portion 72 of the bracket 30, and into the edge 62 of the first shelf 24. A fourth fastener extends through the lower side panel 22 and the outer hole 36 in the lower portion 72 of the bracket 30. A second set of side panels 20, 22 may be connected to the side edges 64 of the shelves 24, 26 in the same manner. In the illustrated embodiment, two brackets are used for interconnecting each pair of side panels to one side of the shelves. While the illustrated embodiment shows only four fasteners and for fastener receiving holes in the bracket 30, additional fasteners and holes may be used, for instance, by using two fasteners at each of the four positions for additional strength.

The above descriptions are those of a current embodiment of the invention. Various alterations and changes can be made without departing from the spirit and broader aspects of the invention, which are to be interpreted in accordance with the principles of patent law including the Doctrine of Equivalents.

The invention claimed is:

1. A wall cabinet system for interconnecting first and second side panels and first and second shelves, the first and second side panels each having an inner panel surface and an outer panel surface opposite the inner panel surface, the inner panel surface of the first side panel having a bottom terminal end, the inner panel surface of the second side panel having a top terminal end, the first and second shelves each including a shelf surface and an end, the wall cabinet system comprising:
   a plurality of fasteners; and
   a first bracket positioned adjacent said inner surfaces of said first and second side panels such that the first bracket is sandwiched between the ends of the first and second shelves and the inner surfaces of the first and second side panels, said first bracket overlying the inner panel surface of the first side panel, the bottom terminal end of the inner panel surface of the first side panel, the top terminal end of the inner panel surface of the second side panel, and the inner panel surface of the second side panel, said first bracket defining a plurality of fastener receiving holes, a first fastener extending through the outer panel surface of the first side panel and into one of said holes; a second fastener extending through the outer panel surface of the second side panel and into one of said holes; a third fastener extending through the outer panel surface of the first side panel, one of said holes, and into the end of the first shelf; a fourth fastener extending through the outer panel surface of the second side panel, one of said holes, and into the end of the second shelf, wherein said first side panel includes a bottom edge adjacent the bottom terminal end of the inner panel surface of said first side panel and said second side panel includes a top edge adjacent the top terminal end of the inner panel surface of the second side panel, said top edge of said second side panel abutting said bottom edge of said first panel.

2. The wall cabinet system of claim 1 wherein said first bracket is positioned between the inner panel surfaces of said first side panel and said second side panel and the ends of said shelves, forming a space between said first and second panels and said shelves.

3. The wall cabinet system of claim 1 wherein said shelves each include a first side edge, wherein said fasteners extending through said shelves extend into a portion of said side edges of said shelves.

4. A wall cabinet system for interconnecting first and second side panels and first and second shelves, comprising:
   a plurality of fasteners; and
   a first bracket, said first bracket defining a plurality of fastener receiving holes, a first fastener extending through one of said holes and into the first side panel; a second fastener extending through one of said holes and into the second side panel; a third fastener extending through one of said holes, said first side panel, and into the first shelf; a fourth fastener extending through one of said holes, the second side panel, and into the second shelf, wherein said shelves each include a first side edge, wherein said fasteners extending through said shelves extend into a portion of said side edges of said shelves, and further comprising a third side panel, a fourth side panel, and a second bracket, said second bracket including a plurality of fastener receiving holes, said first and second shelves each including a second side edge opposite said first side edge, one of said fasteners extending through one of said holes and said third side panel; another of said fasteners extending through one of said holes and said fourth side panel; another of said fasteners extending through one of said holes, said third side panel, and said second edge of said first shelf; another of said fasteners extending through one of said holes, said fourth side panel, and said second side edge of said second shelf.

5. The wall cabinet system of claim 1 wherein said bracket includes a pair of inner holes and a pair of outer holes.

6. The wall cabinet system of claim 1 wherein said shelves are positioned perpendicular to said side panels.

7. A wall cabinet system comprising:

an upper unit including a side panel and a shelf, said upper unit side panel having a panel surface, said panel surface having a bottom terminal end, said upper unit shelf having a shelf surface and an end;

a lower unit including a side panel and a shelf, said lower unit side panel having a panel surface, said panel surface having a top terminal end, said lower unit shelf having a shelf surface and an end;

a bracket connecting said upper unit and said lower unit, said bracket overlying said panel surface of said upper unit side panel, including said bottom terminal end, and said panel surface of said lower unit side panel, including said top terminal end; and a plurality of fasteners, a first fastener extending through said upper unit side panel and said bracket; a second fastener extending through said upper unit side panel, said bracket, and said end of said upper unit shelf; a third fastener extending through said lower unit side panel and said bracket; and a fourth fastener extending through said lower unit side panel, said bracket, and said end of said lower unit shelf.

8. The wall cabinet system of claim 7 wherein said lower unit shelf forms an upper surface of said lower unit, and wherein said upper unit shelf forms a lower surface of said upper unit.

9. The wall cabinet system of claim 8 wherein said upper unit shelf and said lower unit shelf each include a side edge, said fasteners extending into said shelves extending into said side edges of said shelves.

10. The wall cabinet system of claim 7 wherein a portion of said bracket directly contacts said upper unit side panel surface and a portion of said bracket directly contacts said lower unit side panel surface.

11. The wall cabinet system of claim 7 wherein said bracket is a flat plate, said plate defining a pair of inner fastener receiving holes and a pair of outer fastener receiving holes.

* * * * *